W. NEVERS.
Sleds.

No. 136,750.    Patented March 11, 1873.

Witnesses
Phil. F. Larner
Geo. F. Stenz

Inventor.
William Nevers
By Milo Wood
Attorney

UNITED STATES PATENT OFFICE.

WILLIAM NEVERS, OF BRIDGETON, MAINE.

IMPROVEMENT IN SLEDS.

Specification forming part of Letters Patent No. 136,750, dated March 11, 1873.

*To all whom it may concern:*

Be it known that I, WILLIAM NEVERS, of Bridgeton, in the county of Cumberland and State of Maine, have invented certain new and useful Improvements in Sleds, of which the following is a specification:

My invention relates to that class of sleds which are provided with means of propulsion; and it consists in a novel arrangement, with the sled-frame, of a spiked propelling-wheel and a steering device; and I do hereby declare the following to be a full, clear, and exact description of my invention, reference being had to the accompanying drawing forming part of this specification, and in which—

Figure 1:
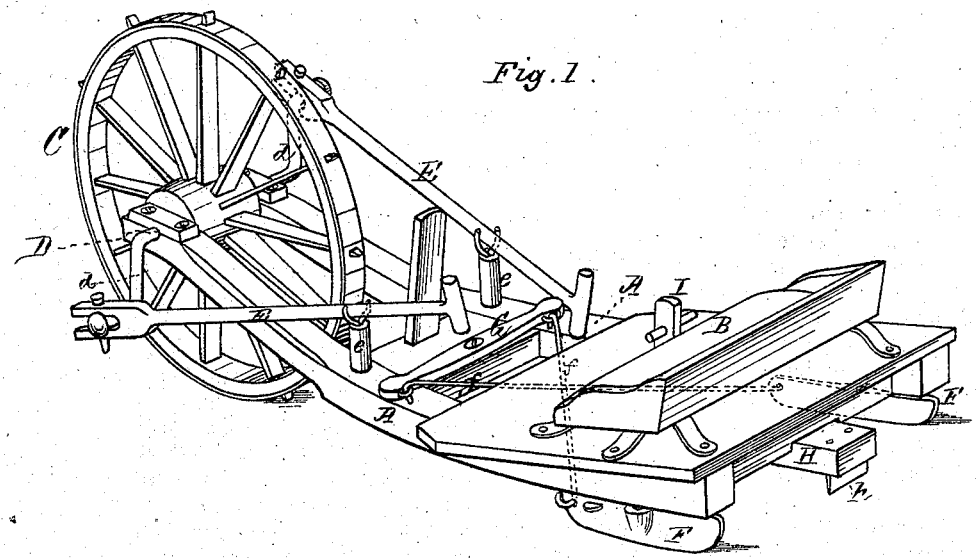
Figure 2:
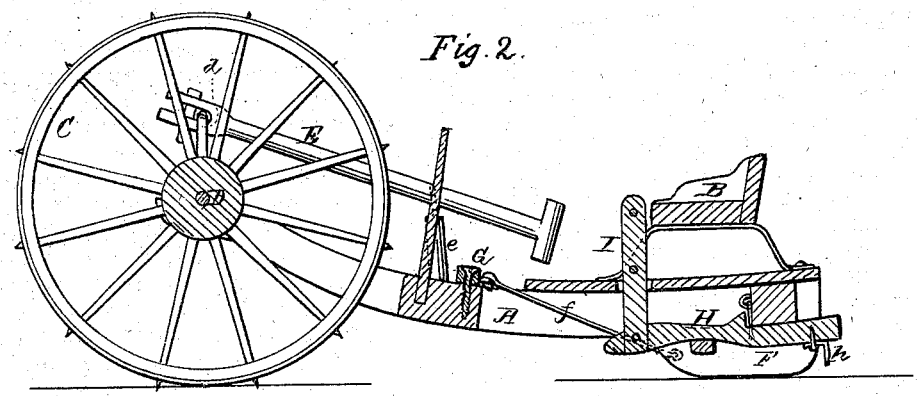

Figure 1 represents a view in perspective of a sled constructed in accordance with my invention, and Fig. 2 a vertical longitudinal section of the same.

A denotes the frame or body of the sled; it is provided at its rear end with a seat, B. The bars of the frame at their forward ends are slightly curved and provided with bearings, by which they are supported upon the shaft of the propelling-wheel. C denotes the propelling-wheel; it is an ordinary spiked wheel placed upon a shaft, D, at the forward end of the frame A, the said shaft having a crank-arm, $d$, upon each side. E denotes the levers by which the wheel C is operated; they are attached respectively to each crank-arm $d$ of the shaft D, and extend to the rear of the sled, passing over guides or supports $e$ upon the frame, and are so arranged as to be easily operated by a person seated upon the sled. F denotes the runners; they are pivoted to the rear of the frame and connected by a bar running beneath the sled. To the front ends of the runners links $f$ are attached; they cross each other under the body of the sled, and passing up through the top of the same are connected with the ends of a pivoted foot-lever, G, placed in front of the seat B within the reach of the operator. By moving the lever G the runners may be turned and the sled guided in any desired direction. H denotes the brake; it consists of a lever pivoted to the under side of the frame A, and provided upon its rear end with a sharp projection, $h$. The projection $h$ is brought in contact with the ice or snow by means of an operating-rod, I, attached to the inner end of the brake-lever and passing up through the body of the sled near the seat B.

I am aware that previous to my invention, in the construction of sleds provided with propelling apparatus, the use of the spiked wheel has been long known. It has generally, however, been proposed to place such wheels at or near the center of the sled, and operate them by cranks, gear-wheels, &c. In all such cases the great objection has been that while propelling the sled upon surfaces which were rough, the spiked wheel often is ineffectual from the fact that it is raised from contact with the ice or snow by reason of the sled-runners coming in contact with the roughened surface. To remedy this defect it has been proposed to place the spiked wheel at the front of the sled, and provide its bearings with springs to cause it to maintain a pressure upon the ice or snow, but this construction has been deemed objectionable from the fact that the springs are liable to be broken by constant exposure. I am not aware that it has ever before been proposed to construct a sled in the manner designed by me.

It will be observed that in my invention the forward end of the sled-frame rests upon and is entirely supported by the axle of the spiked wheel. By this means, no matter what may be the condition of the surface of the ice or snow, the spiked wheel, on account of the weight upon its axle, is caused constantly to have a firm bearing, and the operation of the sled may be thereby uninterrupted.

Having thus described my invention, I claim as new and desire to secure by Letters Patent—

1. The spiked propelling-wheel C, with its operating levers E, in combination with the frame or body A of the sled, substantially as described, whereby the forward end of the frame rests upon and is supported by the shaft of the wheel, for the purpose specified.

2. In combination with the sled-frame A the pivoted runners F, connected with the lever G by means of the links $f$, substantially as and for the purpose described.

WILLIAM NEVERS.

Witnesses:
B. T. CHASE,
N. P. POTTER.